(12) United States Patent
Shinada et al.

(10) Patent No.: US 11,558,952 B2
(45) Date of Patent: Jan. 17, 2023

(54) DIELECTRIC BARRIER DISCHARGE IONIZATION DETECTOR

(71) Applicants: Shimadzu Corporation, Kyoto (JP); OSAKA UNIVERSITY, Suita (JP)

(72) Inventors: Kei Shinada, Kyoto (JP); Katsuhisa Kitano, Osaka (JP)

(73) Assignees: Shimadzu Corporation, Kyoto (JP); OSAKA UNIVERSITY, Suita (JP)

( * ) Notice: Subject to any disclaimer, the term of this patent is extended or adjusted under 35 U.S.C. 154(b) by 585 days.

(21) Appl. No.: 16/712,259

(22) Filed: Dec. 12, 2019

(65) Prior Publication Data
US 2020/0236772 A1 Jul. 23, 2020

(30) Foreign Application Priority Data

Jan. 23, 2019 (JP) .............................. JP2019-009204

(51) Int. Cl.
*H05H 1/24* (2006.01)
*G01N 30/64* (2006.01)
*G01N 30/02* (2006.01)

(52) U.S. Cl.
CPC ........... *H05H 1/2406* (2013.01); *G01N 30/64* (2013.01); *G01N 2030/025* (2013.01); *G01N 2030/642* (2013.01); *H05H 1/246* (2021.05)

(58) Field of Classification Search
CPC .... H05H 1/2406; H05H 1/246; H05H 1/2465; G01N 30/64; G01N 2030/025; G01N 2030/642
See application file for complete search history.

(56) References Cited

U.S. PATENT DOCUMENTS

| | | | |
|---|---|---|---|
| 2010/0104484 A1* | 4/2010 | Wang | ........................ B01J 4/00 422/186.04 |
| 2011/0018546 A1 | 1/2011 | Kitano et al. | |

(Continued)

FOREIGN PATENT DOCUMENTS

| | | |
|---|---|---|
| CN | 107807196 A | 3/2018 |
| JP | 2003173889 A | 6/2003 |

(Continued)

OTHER PUBLICATIONS

First Office Action from the Japanese Patent Office, dated Feb. 22, 2022 for Japanese Patent Application No. JP 2019-009204.

(Continued)

*Primary Examiner* — Alvaro E Fortich
*Assistant Examiner* — Zannatul Ferdous
(74) *Attorney, Agent, or Firm* — Muir Patent Law, PLLC (57) ABSTRACT

A BID includes: a discharger (2) including a dielectric pipe (8) and a pair of electrodes (14, 16) attached on an outer wall of the dielectric pipe, the pair of electrodes (14, 16) being arranged at a distance from each other in a direction along a central axis of the dielectric pipe (8), the discharger (2) being arranged so that plasma generating gas is introduced from a first end of the dielectric pipe (8) and configured to generates dielectric barrier discharge inside the dielectric pipe (8) to generate plasma; a detection section (4) including a sample gas introduction section (31) and a collection electrode (26) for collecting ions, the detection section (4) being configured to ionize components in the sample gas using light emitted from the plasma generated in the discharger (2) and to detect the generated ions by collecting them using the collection electrode (26); and a voltage supply (6; 6') for generating a potential difference between the pair of electrodes (14, 16).

3 Claims, 6 Drawing Sheets

(56) References Cited

U.S. PATENT DOCUMENTS

| | | | | |
|---|---|---|---|---|
| 2011/0214814 A1* | 9/2011 | Iizuka | ............... | C23F 1/08 |
| | | | | 156/345.34 |
| 2012/0097648 A1* | 4/2012 | Foret | ............... | H05H 1/42 |
| | | | | 219/121.52 |
| 2012/0115314 A1* | 5/2012 | Sakamoto | ......... | C23C 16/5096 |
| | | | | 438/479 |
| 2018/0067082 A1* | 3/2018 | Shinada | ............ | H05H 1/2406 |

FOREIGN PATENT DOCUMENTS

| | | |
|---|---|---|
| JP | 2018040718 A | 3/2018 |
| WO | 2009119050 A1 | 10/2009 |

OTHER PUBLICATIONS

First Office Action from the Chinese Patent Office dated Jul. 25, 2022 for corresponding Chinese Patent Application No. 201911319590 3.

Second Office Action dated Nov. 29, 2022 by the Chinese Patent Office for the corresponding Chinese Patent Application No. 201911319590.3.

* cited by examiner

COMPARATIVE EXAMPLE 1
(TRANSFORMER OUTPUT: 5.7 kV)

FIG. 4B

COMPARATIVE EXAMPLE 1
(TRANSFORMER OUTPUT: 7.5 kV)

DIELECTRIC BARRIER DISCHARGE IONIZATION DETECTOR

BACKGROUND OF THE INVENTION

1. Field of the Invention

The present invention relates to a dielectric barrier discharge ionization detector.

2. Description of the Related Art

As a detector for gas chromatography, a dielectric barrier discharge ionization detector (hereinafter referred to as BID) using ionization by dielectric barrier discharge plasma has been put into practical use (see JP 2018-040718 A). The BID uses dielectric barrier discharge whose electrode surface is covered with a dielectric, so that it emits less thermoelectrons and secondary electrons than when using a metal electrode. Further, the BID generates non-equilibrium plasma with very low neutral gas temperature (almost no heat generation) by a low-frequency high-pressure power source to suppress generation of impurity gas due to heating of an inner wall material and achieve a highly stable discharge state, thereby being capable of realizing a high SN ratio.

The BID disclosed in Patent Document 1 is roughly composed of a discharger and a charge collection part provided therebelow. In the discharger, a low-frequency AC high voltage is applied between the high-voltage electrode and the ground electrode that are circumferentially connected to a pipe (dielectric pipe) made of a dielectric such as quartz glass to ionize inert gas supplied to a pipe passage in the dielectric pipe, to thereby form an atmospheric pressure non-equilibrium plasma. Then, a sample component in sample gas introduced into the charge collection part is ionized by action of light (vacuum ultraviolet light) emitted from the plasma and excited species, and the generated ions are collected by a collection electrode, so that the amount of components in the sample gas is detected as an electric charge.

SUMMARY OF THE INVENTION

In the BID, in order to obtain a good S/N ratio, it is necessary to cause a stable discharge between the high-voltage electrode and the ground electrode of the discharger. However, depending on the conditions at the time of discharge, the discharge may extend to a range beyond the part between the high-voltage electrode and the ground electrode, and it may reach the metal connection part connected to the end of the dielectric pipe. The cause of the expansion of the discharge range is due to creeping discharge on the inner wall surface of the dielectric pipe.

When creeping discharge occurs and the discharge range reaches the connection part of the dielectric pipe, the resulting discharge becomes unstable and the SN ratio is deteriorated. Therefore, it is necessary to set the length of the dielectric pipe to be sufficiently long so that the discharge range does not reach the connection part at the end of the dielectric pipe, and secure a sufficient distance between the connection part at the end of the dielectric pipe and the discharge electrode. However, in that case, the entire detector tends to increase in size, and it is difficult to reduce the size of the detector. In addition, when the distance between the end of the dielectric and the discharge electrode is increased, the distance from the position where the discharge is generated to the charge collection part is increased, and the light from the plasma is difficult to reach the sample component. Therefore, high detection sensitivity cannot be obtained.

The present invention has been made in view of the above problem, and an object of the present invention is to suppress occurrence of creeping discharge in a dielectric pipe and to suppress the increase in the size of a detector.

A BID according to the present invention includes: a discharger including a dielectric pipe and a pair of electrodes attached on an outer wall of the dielectric pipe, the pair of electrodes being arranged at a distance from each other in a direction along a central axis of the dielectric pipe, the discharger being arranged so that plasma generating gas is introduced from a first end of the dielectric pipe and configured to generates dielectric barrier discharge inside the dielectric pipe to generate plasma; a detection section including a sample gas introduction section and a collection electrode for collecting ions, the detection section being configured to ionize components in the sample gas using light emitted from the plasma generated in the discharger and to detect the generated ions by collecting them using the collection electrode; and a voltage supply for generating a potential difference between the pair of electrodes. The voltage supply includes an AC power source and a circuit unit, the circuit unit being connected to the AC power source and being configured to vary potentials of the pair of electrodes so that a potential difference between the pair of electrodes periodically reaches a predetermined maximum potential difference.

When one of the pair of electrodes attached to the outer wall of the dielectric pipe is grounded, in order to generate a dielectric barrier discharge in the dielectric pipe, a discharge is generated between the pair of electrodes, it is necessary to increase or decrease the potential of the discharge electrode that is not grounded so that a potential difference of a magnitude necessary for discharge is generated between the pair of electrode. Then, the potential difference between the connection part (potential is zero) at the end of the dielectric pipe and the electrode is increased, and creeping discharge is likely to occur in the dielectric pipe. On the other hand, in order to generate dielectric barrier discharge in the dielectric pipe, it is not necessary to significantly increase or decrease the potential of only one of the pair of electrodes, and it is sufficient that a potential difference of a magnitude necessary for discharge is generated between the pair of electrodes. In other words, if the potential of one electrode is positive and the potential of the other electrode is negative, the potential difference between both the electrodes can be increased while reducing the potential difference between the electrode and the ground potential as compared with the case where any one of the electrodes is grounded.

In the BID according to the present invention, the potential difference between the pair of electrodes attached to the outer wall of the dielectric pipe of the discharger is caused to periodically reach a predetermined maximum potential difference while changing the potentials of the pair of electrodes. Therefore, as compared with the case where any one of the electrodes is grounded, the potential difference between the end of the dielectric pipe and the connection part when a potential difference necessary for discharge is applied between the pair of electrodes is reduced. As a result, creeping discharge is less likely to occur, so there is no need to increase the distance between the electrode and the end of the dielectric pipe, and the increase in the size of the detector can be suppressed.

DETAILED DESCRIPTION OF THE INVENTION

Now, an embodiment of a BID will be described below with reference to the drawings. The embodiment described below is merely an example of a configuration for realizing the present invention, and the present invention is not limited to this.

Figure 1:
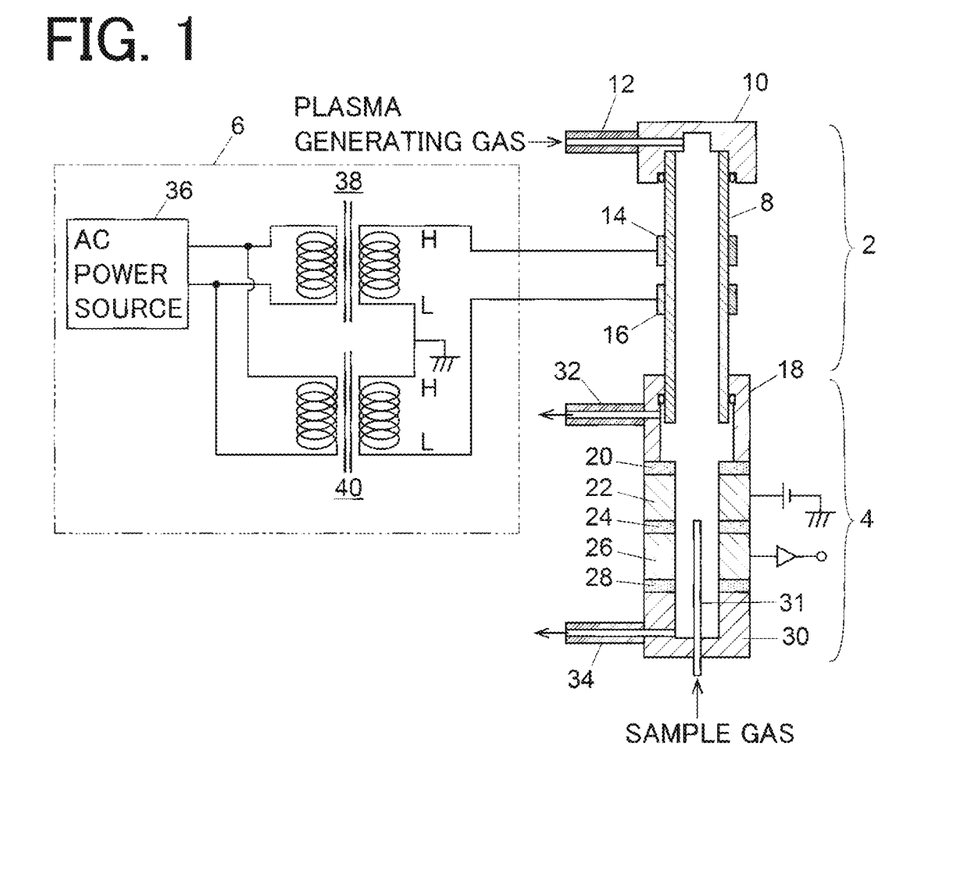
FIG. 1 is a schematic configuration diagram showing an example of a BID.

FIG. 1 shows an example of a BID. The BID of this example mainly includes a discharger 2, a detection section 4, and a voltage supply 6. The discharger 2 generates plasma due to dielectric barrier discharge, ionizes components in sample gas in the detection section 4 by excitation light emitted from the plasma, and detects the generated ions by collecting them using a collection electrode 26 provided in the detection section 4.

The discharger 2 includes a dielectric pipe 8 made of a dielectric such as quartz glass. A pair of electrodes 14 and 16 are attached to the outer wall of the dielectric pipe 8, and a connection member 10 is attached to a first end (upper end in the figure) of the dielectric pipe 8. The pair of electrodes 14 and 16 are attached to the dielectric pipe 8 so as to surround the outer peripheral surface of the dielectric pipe 8 with a space between each other in the direction along the pipe axis of the dielectric pipe 8. A plasma generation gas pipe 12 for supplying plasma generation gas containing helium, argon, or the like is fluidly connected to the connection member 10, and plasma generating gas is supplied to the inside of the dielectric pipe 8 from the first end of the dielectric pipe 8.

The detection section 4 is a hollow tubular part connected to a second end (lower end in the figure) of the dielectric pipe 8 of the discharger 2, and has an internal space for ionizing the components in the sample gas using the excitation light from the discharger 2. The detection section 4 includes a connection pipe 18, a bias electrode 22, a collection electrode 26, and a terminal member 30. The connection member 18 is connected to the second end of the dielectric pipe 8, and the bias electrode 22 is provided with the insulating member 20 interposed with respect to the connection member 18. The collecting electrode 26 is provided with the insulating member 24 interposed with respect to the bias electrode 22, and the terminal member 30 is provided with the insulating member 28 interposed with respect to the collecting electrode 26. Pipes 32 and 34 for discharging the plasma generation gas and the sample gas in the internal space of the detection section 4 are connected to the connection member 18 and the terminal member 30, respectively. A sample gas introduction pipe 31 (sample gas introduction section) for introducing a sample gas is inserted into the detection section 4 from the bottom surface of the terminal member 30.

The voltage supply 6 includes an AC power source 36 and a circuit unit. The circuit unit is configured to cause the potential difference between the pair of electrodes 14 and 16 attached to the dielectric pipe 8 of the discharger 2 to periodically reach a predetermined maximum potential difference while changing the potentials of the pair of electrodes 14 and 16.

The circuit unit of the voltage supply 6 includes a first step-up transformer 38 and a second step-up transformer 40. A primary coil of the first step-up transformer 38 and a secondary coil of the second step-up transformer 40 are connected to the AC power source 36 in parallel with each other. A first end (hereinafter referred to as H end) of a secondary coil of the first step-up transformer 38 is electrically connected to the electrode 14, and a second end (hereinafter referred to as L end) of the secondary coil of the second step-up transformer 40 is electrically connected to the electrode 16. A second end (hereinafter referred to as L end) of the secondary coil of the first step-up transformer 38 and a first end (hereinafter referred to as H end) of the secondary coil of the second step-up transformer 40 are both grounded.

The step-up magnification of the first step-up transformer 38 is m, and the step-up magnification of the second step-up transformer 40 is n. When an AC voltage with an amplitude V is output from the AC power source 36, an AC high voltage with an amplitude mV is generated between the H end and the L end of the secondary coil of the first step-up transformer 38, and an AC high voltage with an amplitude of nV is generated between the H end and the L end of the secondary coil of the second step-up transformer 40. Since the L end of the secondary coil of the first step-up transformer 38 and the H end of the secondary coil of the second step-up transformer 40 are both grounded, the AC high voltage generated in the secondary coil of the first step-up transformer 38 and the AC high voltage generated in the secondary coil of the second step-up transformer 40 have waveforms whose phases are mutually inverted (the phases are mutually shifted by 180 degrees).

With the configuration described above, a maximum potential difference of a magnitude of (m+n) V is periodically generated between the pair of electrodes 14 and 16. Therefore, it is only necessary to set V, m, and n so that that the maximum potential difference (m+n) V is higher than the potential difference (discharge start voltage) required to generate the dielectric barrier discharge between the electrodes 14 and 16. On the other hand, since the amplitudes of the AC high voltages applied to the electrodes 14 and 16 are mV and nV, respectively, the maximum potential difference between the electrodes 14 and 16 and the connection members 10 and 18 (potentials are zero) at both ends of the dielectric pipe 8 becomes lower than the discharge start voltage. As a result, creeping discharge from the electrodes 14 and 16 to the connection members 10 and 18 hardly occurs even when the distances between the electrodes 14 and 16 and the connection members 10 and 18 at both ends of the dielectric pipe 8 are shortened, and the dielectric barrier discharge can be generated stably. Furthermore, since the distance between the position where the discharge occurs and the detection section 4 can be shortened, the detection sensitivity can be improved.

Here, when the relationship between the step-up magnification m of the first step-up transformer 38 and the step-up magnification n of the second step-up transformer 40 is set to m=n, the maximum potential difference between the electrodes 14 and 16 and the ground potential can be minimized, and creeping discharge can be efficiently suppressed. Note that m=n is not necessarily required.

As described above, in this embodiment, the maximum potential difference of the magnitude necessary for generating the dielectric barrier discharge is periodically generated between the pair of electrodes 14 and 16, and the maximum potential difference between the electrodes 14 and 16 and the ground potential is suppressed to be low, thereby suppressing generation of creeping discharge. In the example of FIG. 1, the two step-up transformers 38 and 40 are used to realize such an operational effect, but the present invention is not limited to such a configuration. Similar operational effects can also be realized by using only one step-up transformer 38, as shown in FIG. 2.

Figure 2:
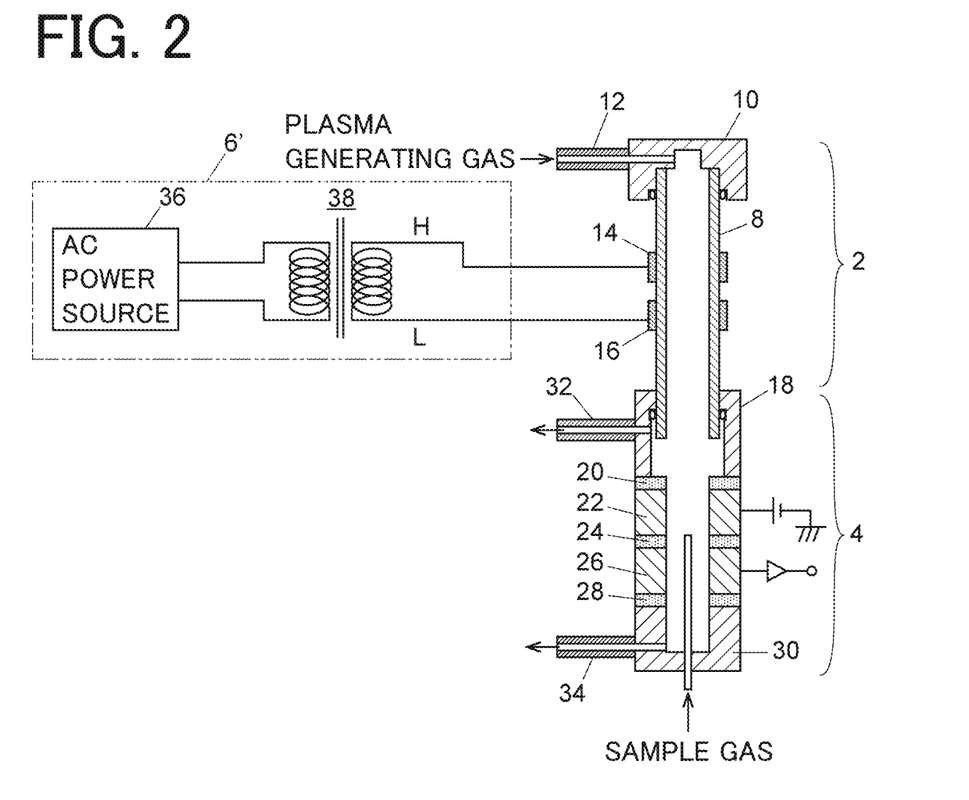
FIG. 2 is a schematic configuration diagram showing another example of the BID.

In the example shown in FIG. 2, a voltage supply 6' includes an AC power source 36 and a circuit unit including one step-up transformer 38. In the step-up transformer 38 of the voltage supply 6', both ends of a secondary coil are electrically connected to the electrodes 14 and 16, respectively. When an AC voltage with an amplitude V is output from the AC power source 36, an AC high voltage with an amplitude mV is applied between the pair of electrodes 14 and 16 by the step-up transformer 38 having a step-up magnification of m. That is, a maximum potential difference of mV is periodically generated between the pair of electrodes 14 and 16.

On the other hand, since neither the H end nor the L end of the secondary coil of the step-up transformer 38 is grounded, there is no path for a current to escape to the ground even if a potential difference occurs at both ends of the secondary coil. The electrical neutrality of the secondary coil and the entire discharge electrode is always maintained. Therefore, the total potential at the H end and L end of the secondary coil of the step-up transformer 38 is always zero. That is, the potentials of the electrodes 14 and 16 are always inverted in phase, and the potential waveforms of the electrodes 14 and 16 both have an amplitude mV/2. Therefore, the maximum potential difference between the electrodes 14 and 16 and the ground potential is smaller than the discharge generation voltage, and the suppressing effect of the creeping discharge is obtained.

Figure 3:
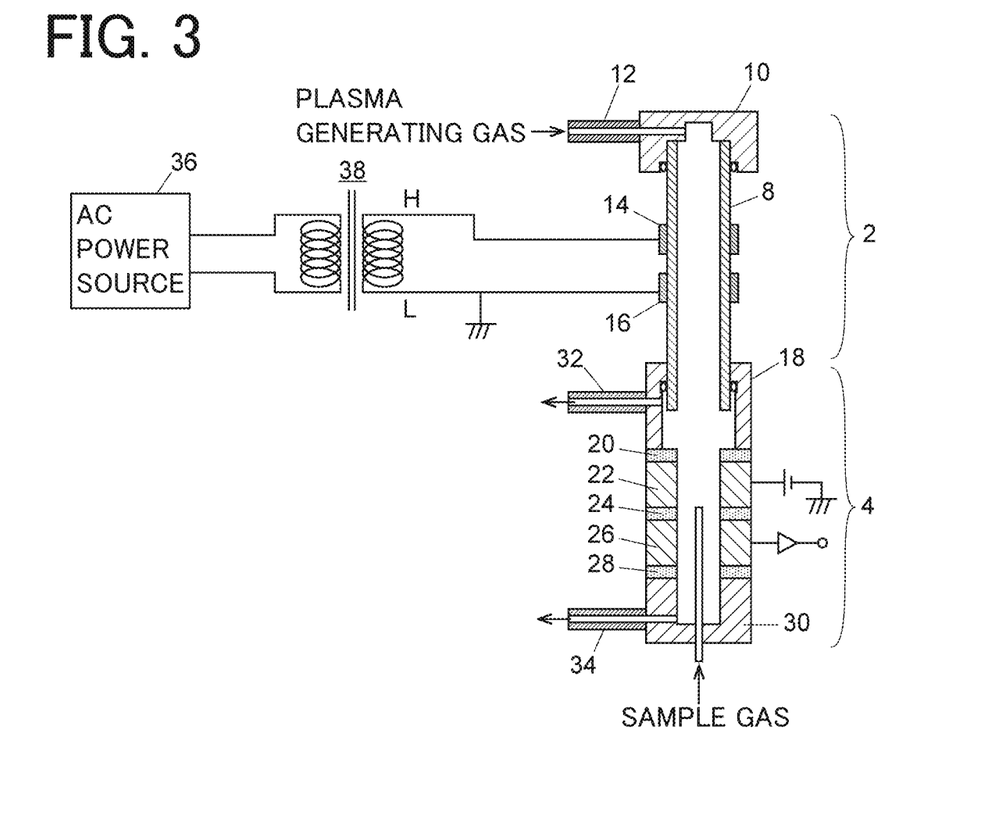
FIG. 3 is a schematic configuration diagram showing a configuration of a comparative example in which one of a pair of electrodes attached to a dielectric pipe is grounded in order to verify an effect of the configuration of the example of the BID.

As shown in FIG. 3, a configuration is considered in which the H end of the secondary coil of the step-up transformer 38 connected to the AC power source 36 is connected to the electrode 14 and the L end is grounded together with the electrode 16. In such a configuration, when an AC voltage with an amplitude V is output from the AC power source 38, an AC high voltage with an amplitude mV is applied between the electrodes 14 and 16. On the other hand, since the electrode 16 is grounded and the potential of the electrode 16 is always zero, the waveform of the potential of the electrode 14 has an amplitude mV. That is, the maximum potential difference between the electrode 14 and the ground potential is the same magnitude as the discharge generation voltage.

Figure 4A:
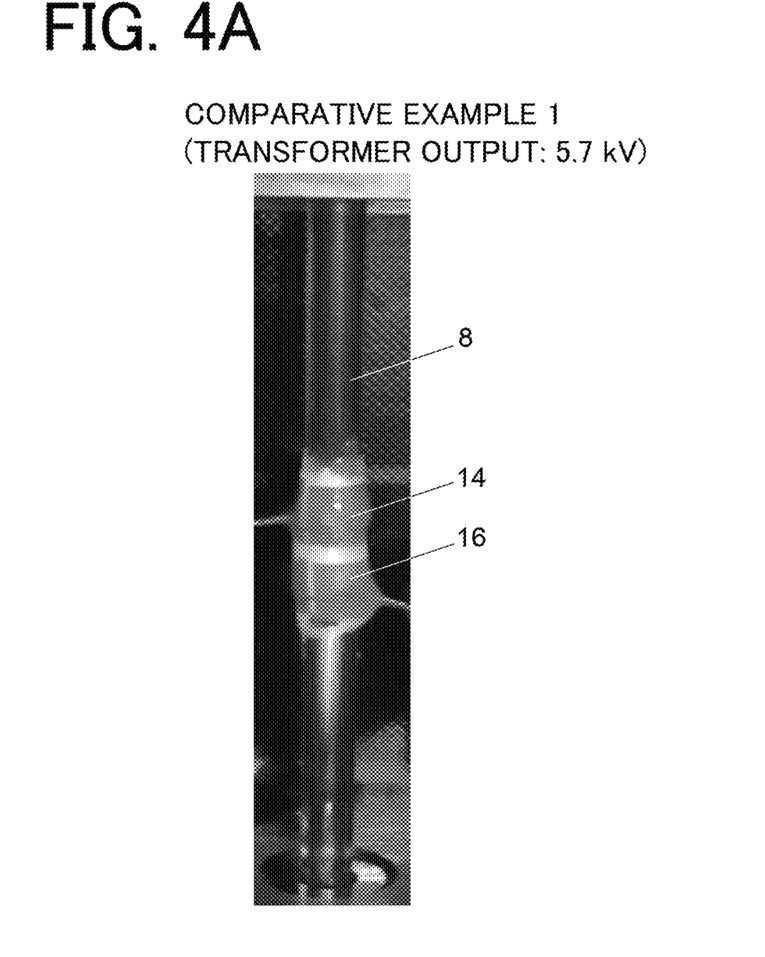
FIG. 4A is an image showing a discharge state in the dielectric pipe when a voltage of 5.7 kV is applied between a pair of electrodes in a comparative example.
Figure 4B:
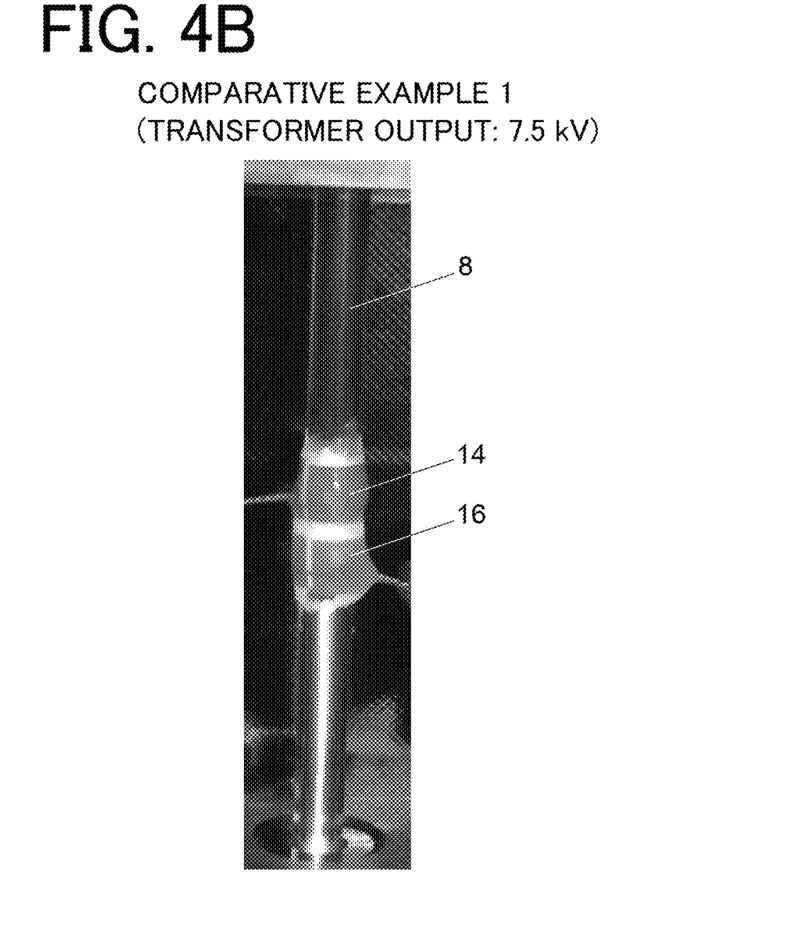
FIG. 4B is an image showing a discharge state in the dielectric pipe when a voltage of 7.5 kV is applied between the pair of electrodes in a comparative example.
Figure 4C:
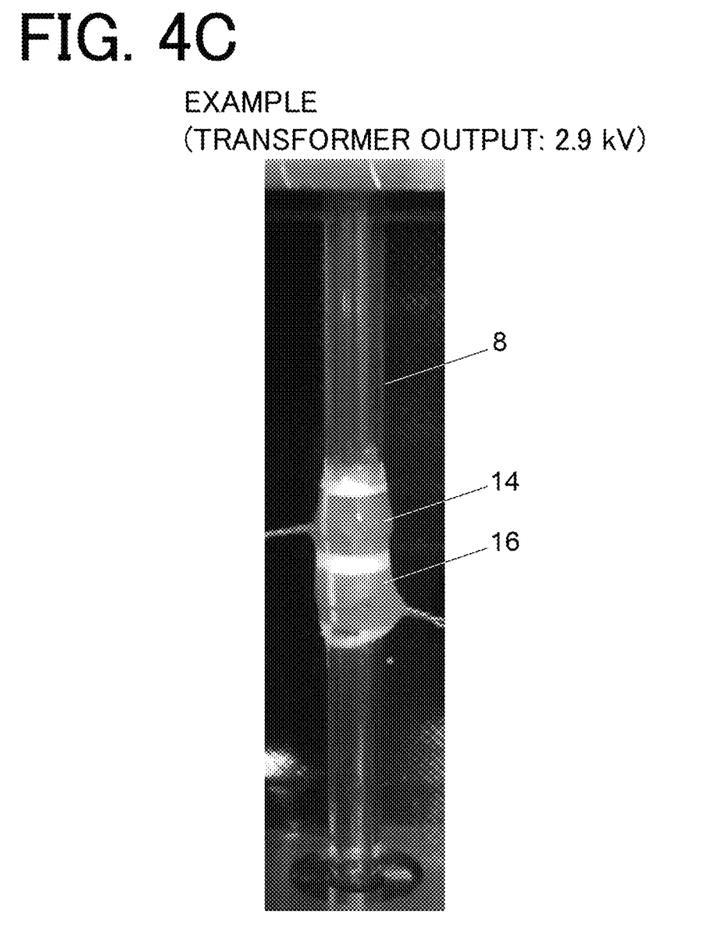
FIG. 4C is an image showing a discharge state in the dielectric pipe when a voltage of 5.8 kV is applied between the pair of electrodes in the example in FIG. 1.

FIG. 4A and FIG. 4B are images showing the verification result of the discharge state in the case of using the configuration of FIG. 3, and FIG. 4C is an image showing the verification result of the discharge state in the case of using the configuration of FIG. 1.

In the verification of FIG. 4A, an AC high voltage with an amplitude of 5.7 kV is generated at both ends of the step-up transformer 38 of FIG. 3, which causes a potential difference of 5.7 kV at the maximum between the electrode 14 and the ground potential. Therefore, it can be seen that the discharge range extends to a wider range than the electrodes 14 and 16. In the verification of FIG. 4B, the amplitude of the AC high voltage generated at both ends of the step-up transformer 38 is increased to 7.5 kV, and it can be seen that the discharge range reaches the end of the dielectric pipe 8.

In contrast, as shown in FIG. 4C, when an AC high voltage with an amplitude of 2.9 kV is generated at both ends of the first step-up transformer 38 and the second step-up transformer 40 of FIG. 1, a maximum potential difference of 5.8 kV is periodically generated between the electrodes 14 and 16, and a dielectric barrier discharge is stably generated between the electrodes 14 and 16. Since the maximum potential difference between the electrodes 14 and 16 and the ground potential is 2.9 kV, which is smaller than the discharge start voltage, it can be seen that the discharge range remains within the range between the electrodes 14 and 16.

In the embodiment described above, the configuration in which only the pair of electrodes 14 and 16 are attached to the outer wall of the dielectric pipe 8 has been described, but the present invention is not limited to this, and it is only necessary that at least one pair of electrodes is provided.

One embodiment of the BID according to the present invention includes: A BID according to the present invention includes: a discharger including a dielectric pipe and a pair of electrodes attached on an outer wall of the dielectric pipe, the pair of electrodes being arranged at a distance from each other in a direction along a central axis of the dielectric pipe, the discharger being arranged so that plasma generating gas is introduced from a first end of the dielectric pipe and configured to generates dielectric barrier discharge inside the dielectric pipe to generate plasma; a detection section including a sample gas introduction section and a collection electrode for collecting ions, the detection section being configured to ionize components in the sample gas using light emitted from the plasma generated in the discharger and to detect the generated ions by collecting them using the collection electrode; and a voltage supply for generating a potential difference between the pair of electrodes. The voltage supply includes an AC power source and a circuit unit, the circuit unit being connected to the AC power source and being configured to vary potentials of the pair of electrodes so that a potential difference between the pair of electrodes periodically reaches a predetermined maximum potential difference.

In the above-described embodiment, a first aspect is given in which the voltage supply provides the pair of electrodes with potentials having phases reversed with each other. Then, the maximum potential difference between the pair of electrodes can be increased without increasing the maximum potential difference between the pair of electrodes and the ground potential, and creeping discharge can be effectively suppressed.

As an example of the configuration of the circuit unit of the voltage supply of the above first aspect, a configuration is given in which the circuit unit of the voltage supply includes first and second step-up transformers that comprise a primary coil and a secondary coil respectively and step up a voltage applied from the AC power source respectively, the primary coil of the first step-up transformer and the primary coil of the second step-up transformer are connected to the AC power source in parallel with each other, a second end of the secondary coil of the first step-up transformer and the first end of a secondary coil of the second step-up transformer are grounded so that a first end of the secondary coil of the first step-up transformer and a second end of the secondary coil of the second step-up transformer are always inverted in phase, and in which the first end of the secondary coil of the first step-up transformer is connected to one of the pair of electrodes, and the second end of the secondary coil of the second step-up transformer is connected to the other of the pair of electrodes.

In the configuration of the circuit unit, the step-up magnification of the first step-up transformer and the step-up magnification of the second step-up transformer may be the same. Then, the maximum potential difference between each of the pair of electrodes and the ground potential can be minimized, and creeping discharge can be effectively suppressed.

In addition, as another example of the circuit unit of the voltage supply of the first aspect, a configuration is given in which the circuit unit of the voltage supply includes a step-up transformer that steps up a voltage applied from the AC power source, and in which a first end of a secondary coil of the step-up transformer is connected to one of the pair of electrodes, and a second end of the secondary coil is connected to the other of the pair of electrodes.

What is claimed is:

1. A dielectric barrier discharge ionization detector, comprising:
    a discharger including a dielectric pipe and a pair of electrodes attached on an outer wall of the dielectric pipe, the pair of electrodes being arranged at a distance from each other in a direction along a central axis of the dielectric pipe, the discharger being arranged so that plasma generating gas is introduced from a first end of the dielectric pipe and configured to generate dielectric barrier discharge inside the dielectric pipe to generate plasma;
    a detection section including a sample gas introduction section and a collection electrode for collecting ions, the detection section being configured to ionize components in the sample gas using light emitted from the plasma generated in the discharger and to detect the generated ions by collecting them using the collection electrode; and
    a voltage supply for generating a potential difference, with potentials having phases reversed with each other, between the pair of electrodes,
    wherein the voltage supply includes an AC power source and a circuit unit, the circuit unit being connected to the AC power source and being configured to vary both potentials of the pair of electrodes so that a potential difference between the pair of electrodes periodically reaches a predetermined maximum potential difference,
    wherein the circuit unit of the voltage supply includes first and second step-up transformers that comprise a primary coil and a secondary coil respectively and step up a voltage applied from the AC power source respectively,
    wherein the primary coil of the first step-up transformer and the primary coil of the second step-up transformer are connected to the AC power source in parallel with each other,
    wherein a second end of the secondary coil of the first step-up transformer and the first end of a secondary coil of the second step-up transformer are grounded so that a first end of the secondary coil of the first step-up transformer and a second end of the secondary coil of the second step-up transformer are always inverted in phase, and
    wherein the first end of the secondary coil of the first step-up transformer is connected to one of the pair of electrodes, and the second end of the secondary coil of the second step-up transformer is connected to the other of the pair of electrodes.

2. The dielectric barrier discharge ionization detector according to claim 1, wherein step-up magnification of the first step-up transformer and step-up magnification of the second step-up transformer are the same.

3. A dielectric barrier discharge ionization detector, comprising:
    a discharger including a dielectric pipe and a pair of electrodes attached on an outer wall of the dielectric pipe, the pair of electrodes being arranged at a distance from each other in a direction along a central axis of the dielectric pipe, the discharger being arranged so that plasma generating gas is introduced from a first end of the dielectric pipe and configured to generate dielectric barrier discharge inside the dielectric pipe to generate plasma;
    a detection section including a sample gas introduction section and a collection electrode for collecting ions, the detection section being configured to ionize components in the sample gas using light emitted from the plasma generated in the discharger and to detect the generated ions by collecting them using the collection electrode; and
    a voltage supply for generating a potential difference, with potentials having phases reversed with each other, between the pair of electrodes,
    wherein the voltage supply includes an AC power source and a circuit unit, the circuit unit being connected to the AC power source and being configured to vary both potentials of the pair of electrodes so that a potential difference between the pair of electrodes periodically reaches a predetermined maximum potential difference,
    wherein the circuit unit of the voltage supply includes a step-up transformer that steps up a voltage applied from the AC power source, and
    wherein a first end of a secondary coil of the step-up transformer is connected to one of the pair of electrodes, and a second end of the secondary coil is connected to the other of the pair of electrodes.

* * * * *